DUANE D. HARMON
ROBERT E. GERACE
INVENTOR.

BY Charles C. Krawczyk

ATTORNEY

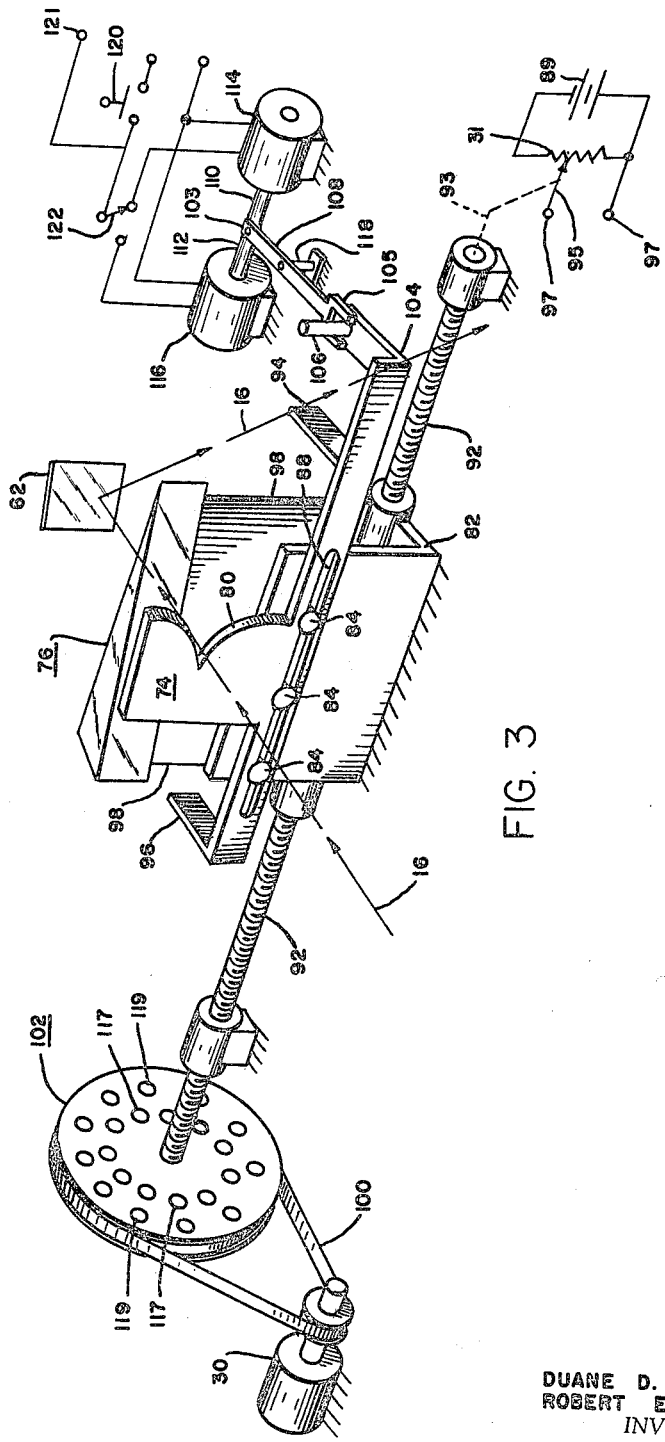

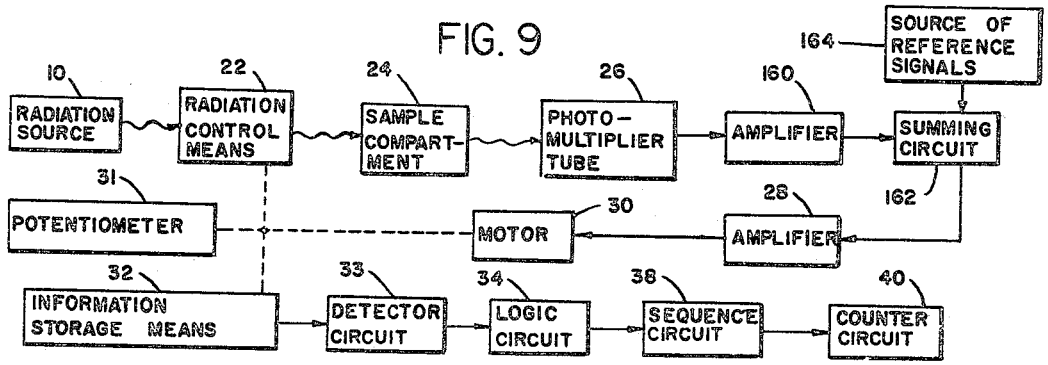
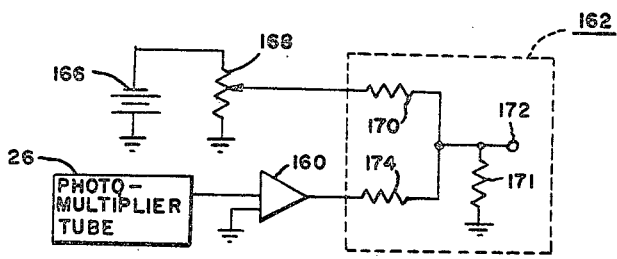
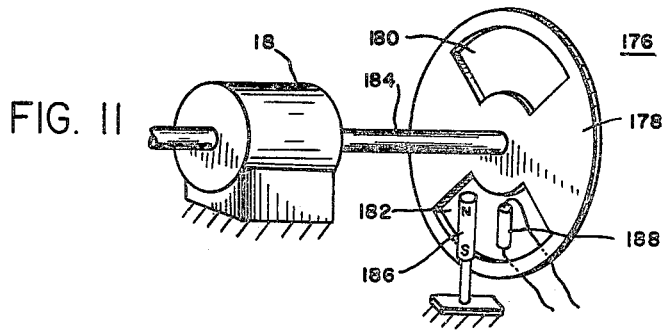
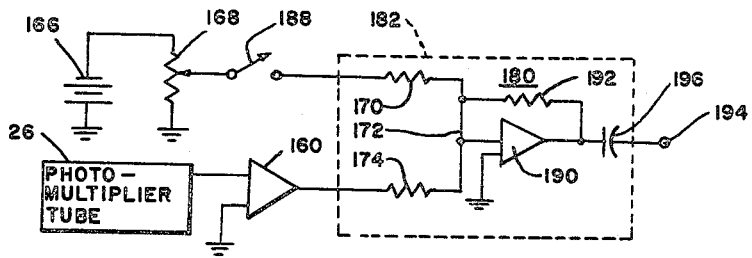

United States Patent Office 3,490,875
Patented Jan. 20, 1970

3,490,875
PHOTOELECTRIC MEASURING SYSTEM INCLUDING TWO CONTROLLED RADIATION ATTENUATORS
Duane D. Harmon, Irondequoit, and Robert E. Gerace, Greece, N.Y., assignors to Bausch & Lomb Incorporated, Rochester, N.Y., a corporation of New York
Filed Feb. 24, 1966, Ser. No. 529,678
Int. Cl. G01n 31/14, 21/22, 33/16
U.S. Cl. 23—253
16 Claims

ABSTRACT OF THE DISCLOSURE

A photoelectric system is disclosed for measuring variations in optical intensity wherein two radiation control devices are inserted in a beam of radiation to control the intensity of radiation received by photodetector. A servosystem, responsive to the signal generating by the photogenerator, initially drives the first and second devices to preset the apparatus in condition for making the measurement and subsequently drives one of the devices to make the measurements.

This invention relates to analysis apparatus in general and more particularly to apparatus for measuring the kinetic reaction rate of physical or chemical processes.

Very seldom is a specimen or species which is to be tested or analyzed, found in a form that is completely isolated from substances that may interfere with its analysis. In many cases, the separation of the species is either impractical, uneconomical or laborious. Accordingly, it is advantageous to perform a kinetic analysis that does not require separation. For example, kinetic methods are appropriate in the cases including polymers wherein the usual separation techniques are not applicable when the groups to be analyzed are formed from the same molecule. A kinetic analysis takes advantage of the difference in reaction rates of the components in a mixture by isolating the reaction of the desired species and thereby enabling calculation of the initial concentrations of these components. The reaction may be physical or chemical in nature. Although primary emphasis will be given to chemical reactions, reactions based upon purely physical mechanisms, such as diffusion processes, rate of evaporation, etc., are often adaptable to kinetic analysis.

All chemical reactions take place at some finite rate that is a function of temperature, pressure, concentration of the species, and presence of catalysts or inhibitors. A thorough knowledge of the concentration of a species or constituent in a mixture can be obtained by observing such kinetic reactions. Accordingly, with proper choice of the above conditions, the reaction rate of a particular species in a mixture may be made sufficiently different from the others and therefore may be effectively isolated for an accurate study. Also, in many reactions, the reaction rates are proportional to the concentration of a catalyst. As a result, an analysis on a catalytic species can be made by adding a small quantity of such species to the chemical reagent wherein the resultant reaction rate provides a measure of the concentration of the species.

An example of a catalytic species are enzymes such as lactate dehydrogenase (LDH), asparatate amino transferase (GOT) and alanine aminotransferase (GPT). These enzymes are present in many biological materials. It has been found that certain human organs such as the heart, liver or the red blood cells are rich in various ones of the above mentioned enzymes. Furthermore, it has also been found that in case of a malfunction of these organs, the enzymes leach out into the blood stream. As a result, a high concentration of particular enzymes in the blood stream provides an early diagnostic aid for determining ailments such as liver trouble, gallstones, hepattitis, heart attacks, etc.

A method of determining enzyme concentrations in blood serum is described in an article by Henry et al. in the "American Journal of Clinical Pathology," vol. 34, No. 4, October 1960, pp. 381–398. The article describes a method of entering such enzymes into reversible chemical reactions wherein the enzymes act as catalysts to aid the oxidization of a reduced form of nicotinamide-adenine dinucleotide (reduced (NAD)) to NAD or reverse. The concentration of enzymes is determined by the response of the chemical reaction to applied radiation. For example, reduced NAD is highly absorbent to radiation in the order of 340 nanometers while NAD is transparent. By adding an excess of reduced NAD or NAD (depending upon the species of enzymes being analyzed), the change of radiation absorption observed (the reaction rate) in the initial portion of the reaction is linear with time and directly proportional to the concentration on enzymes. A tabulation was made listing the normal value of enzyme concentration based upon the initial kinetic rate of reaction thereby providing a standard for comparison.

The spectrophotometric method employed by Henry et al. requires a step by step plot of the reaction and an interpolation of a plotted curve for the reaction rate. This type of analysis is costly, time consuming and requires specially trained technical personnel to perform such tests. In order to be able to use such an analysis as a diagnostic aid, the testing apparatus should be economically feasible and be simple to operate so that accurate results can be achieved in a reasonable time by laboratory technicians. To be fully effective, the testing method should be adaptable to be used in automated testing apparatus.

None of the presently available automated spectrophotometric testing apparatus provide a means for obtaining this type kinetic analysis of chemical reactions. The presently available testing apparatus generally provide an analysis based upon a reaction carried to a completion. As a result, it is very difficult to obtain a comparison to the tabulation of normal values set forth by Henry et al.

In addition to the foregoing, the initial optical densities (degrees of radiation absorbance) of the kinetic chemical reactions to be analyzed vary according to the optical density of the sample of blood serum being tested. The measure of radiation absorbance of material in general (gaseous, liquid or solid) is set forth in the Beer-Lambert equation wherein the absorbance varies as a logarithmic function of the ratio of the intensity of radiation transmitted by the material over the intensity of the radiation applied thereto. Accordingly, a small difference in the optical density between samples of blood serum results in a large change in the intensity of the radiation transmitted. The testing apparatus for monitoring the rate of change of radiation absorbance (reaction activity) should be able to accept such samples having different initial optical densities and provide an accurate indication of the reaction activity regardless of the initial density of the sample. Furthermore, the apparatus should accurately monitor the expected wide range of transmitted radiation intensities without any manual adjustments to compensate for the optical densities from sample to sample or without frequent recalibration.

It is therefore an object of this invention to provide new and improved apparatus for monitoring a kinetic reaction.

It is also an object of this invention to provide new and improved apparatus for measuring a change in radiation absorption.

It is also an object of this invention to provide new and improved apparatus for accurately measuring the reaction rate of a kinetic reaction.

It is still a further object of this invention to provide new and improved apparatus for accurately measuring the rate of change of radiation absorption of a chemical reaction.

It is also an object of this invention to provide new and improved apparatus for accurately measuring the change of radiation absorption of a chemical reaction for increasing or decreasing radiation absorption.

It is also an object of this invention to provide apparatus for kinetically measuring the chemical activity of enzymes and providing a reading corresponding to the concentration of enzymes.

Apparatus embodying the invention include means for measuring the change of radiation absorbance of a test sample that is exposed to a source of radiation. The test sample may, for example, include a kinetic chamical reaction whose radiation absorption characteristics change as the chemical reaction progresses. Means are provided for receiving the radiation transmitted through the test sample and comparing the transmitted radiation with a standard signal to develop an electrical control signal. By way of example, the means may be a radiation sensitive device such as a photomultiplier tube receiving the transmitted radiation and a reference beam of radiation. First and second control means are provided to establish a balanced condition between the transmitted radiation and the standard signal which may be the reference beam of radiation or an electrical signal. Motor means responsive to the control signal is coupled to initially drive both the first and second control means to preset the system in the range for establishing a balanced condition between the transmitted radiation and the standard signal and for subsequently driving the first control means in accordance with the change of radiation absorbance of the test sample. In effect, the second control means functions as a coarse control for conditioning the system for the range of radiation to be monitored while the first control means functions as a fine control for accurately and continuously establishing a balanced condition. Means are coupled to the first control means to monitor the movement of the first control means and to provide an indication of the change of the radiation absorbance or transmission of the test sample.

A further feature of the invention provides for introducing a gross unbalance into the system. The motor means responds to the unbalanced condition to drive both the first and second control means in a manner to overshoot an initial balance condition. The second control means is positioned about the point of maximum overshoot and thereby presets the range of control for the first control means. The motor means responds to the overshoot to reverse its direction to drive the first control means toward a balance condition in the balancing direction to conpensate for the change in test sample absorption thereby reducing errors in the measuring system due to such nonlinearities such as dead-band, back-lash etc.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 3 is a perspective view of a portion of optical portions of the enzyme analyzing apparatus of FIGURE 1;

FIGURE 9 is a block diagram of a second embodiment of enzyme analyzing apparatus embodying the invention;

FIGURE 10 is a schematic diagram of a portion of the block diagram of FIGURE 9;

FIGURE 11 is a perspective view of a switching device for a modification of the enzyme analyzer of FIGURE 9; and FIGURE 12 is a schematic diagram of a portion of the block diagram of FIGURE 10 including a portion of the switching device of FIGURE 11.

Figure 1:
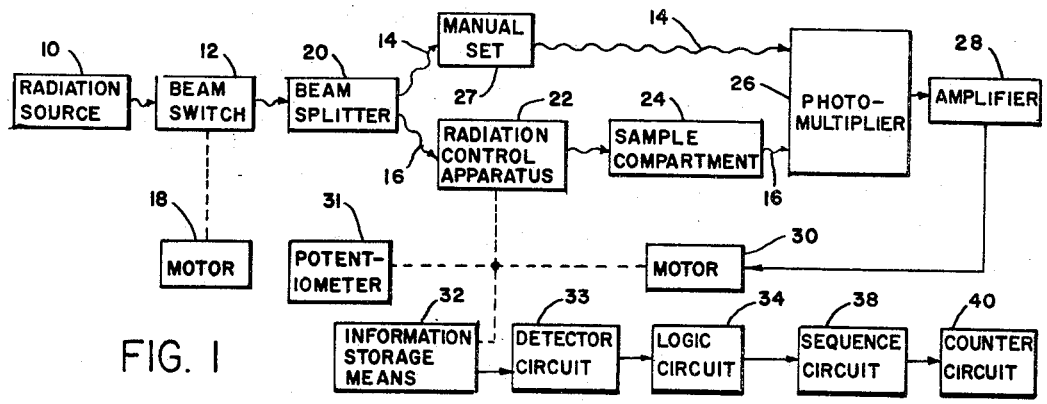
FIGURE 1 is a block diagram of enzyme analyzing apparatus embodying the invention.

The invention will be described in the context of an enzyme analyzer, but it is to be understood that the fundamental concepts to be described are more generally applicable. The enzyme analyzing apparatus of FIGURE 1 includes a source of radiation 10 applying radiation on a beam switch 12. The beam switch 12 is driven by a motor 18 to chop the radiation applied to a beam splitter 20 at a 60 cycle rate. The beam splitter 20 provides alternate reference and sample beams 14 and 16 respectively, that are 180° out of phase with each other and 90° out of phase with the line voltage. The chopped sample beam 16 is passed through a radiation control means 22 and a sample compartment 24 to a photomultiplier tube 26. The chopped reference beam 14 is applied through manual set means 27 that presets the intensity of the reference beam applied to the photomultiplier tube 26. Electrical signals corresponding to the intensity of the chopped reference and sample beams are generated by the photomultiplier tube 26, amplified by an amplifier 28 and applied to a field winding of a two phase servomotor 30. The other winding of the servomotor is energized by the line voltage. The servomotor 30 is coupled to drive the radiation control means 22, thereby completing a feedback servo control loop. A potentiometer 31 is coupled to the radiation control means 22 to provide a means for obtaining an analog signal corresponding to position and movement of the radiation control means.

Information storage means 32, such as a counter wheel or encoded disk, is coupled to move in synchronous relation with the radiation control means 22. A detector circuit 33 detects the information stored in the information storage means 32 in response to the movement of the information storage means to generate electrical signals that are a function of the movement of the radiation control means 22. The electrical signals are applied to a logic circuit 34 providing a means for accepting selected ones of the electrical signals as a function of the movement of the radiation control means and rejecting those signals that are generated as a result of erratic movement due to undesirable noise and transients.

The logic circuit is coupled to a sequence circuit 38 that is activated after a predetermined interval of sufficient duration for the radiation control means 22 to reach the initial balance or null position. After the predetermined interval, the sequence circuit 38 applies the signals being passed by the logic circuit 34 for a preset measuring time duration to a counter circuit 40. The counter circuit counts the signals that are proportional to the movement of the radiation control means 22 to provide a reading corresponding to the rate of enzyme activity for the measuring time duration which is a function of the enzyme concentration of the test sample.

When a test sample is initially inserted in the sample compartment 24, the photomultiplier 26 generates a 60 cycle signal having an amplitude and polarity determined by the difference in intensity between the test sample and reference beams. The amplified 60 cycle signal is supplied to the motor 30 which rapidly drives the radiation control means 22 to an initial balance equalizing the intensity of the reference and sample beams. This presets the apparatus according to the initial optical density of the test sample to accommodate and analyze the range of kinetic enzyme activity of the sample under test.

As previously mentioned, enzymes such as those found in blood serum can be entered into a reversible chemical reaction as a catalyst wherein the radiation absorbance of the test sample changes as the chemical reaction proceeds. By adding an excess of regent (NAD or reduced NAD), the rate of the chemical reaction becomes substantially independent of the amount of reagent used. On the other hand, since the enzyme sample is functioning as a catalyst, the rate of the reaction is directly related to the concentration of enzymes in the sample. In the initial portion of the chemical reaction, the rate of change of radiation absorption exhibited by the test sample is a linear function of the concentration of enzymes. By monitoring this rate of change of radiation absorption, a direct comparison can be made to normal or standard enzyme concentrations. Depending upon the type of chemical reaction involved, the absorbance of the test sample increases or decreases. The radiation control means 22 continuously varies the intensity of the radiation applied to the test sample, as an inverse function of the absorbance of the sample, thereby providing a means for kinetically monitoring the enzyme activity of the test sample.

When the temperature of the test sample is held constant, the change in absorbance ($\Delta A$) of a test sample is set forth by the following equation:

$$\Delta A = ab(\Delta C) \qquad (1)$$

wherein $a$ is the index of absorption for the reagent used (such as reduced NAD), $b$ is the path length and $\Delta C$ is the change in the reagent.

The change in the reagent equals $$\Delta C = \frac{K(C_E V_S T)}{V_T} \qquad (2)$$

wherein K is a constant, $C_E$ is the concentration of the enzyme, $V_S$ is the volume of the test serum, T is the time during which the chemical reaction progresses and $V_T$ is the total volume.

Substituting Equation 2 into Equation 1, the change in absorbance is equal to $$\Delta A = \frac{abKC_E V_S T}{V_T} \qquad (3)$$

All the factors in the right-hand portion of the Equation 3 are known constants or can be held fixed during a chemical process except $C_E$ so that the Equation 3 can be reduced to $$\Delta A = K^1 C_E \qquad (4)$$

where $$K^1 = \frac{abKV_S T}{V_T} \qquad (5)$$

It can be seen from the Equation 4, that the concentration of enzymes in a test sample ($C_E$) is a direct function of the change in radiation absorbance over a fixed period of time. The actual value of $K^1$ need not be considered since the concentration of enzymes ($C_E$) need only be compared to that of a normal value for diagnostic purposes or to a calculated sample having a known concentration of enzymes for analysis.

In order to effectively measure the enzyme concentration of human blood serum, the instrument should be capable of covering a range of initial sample densities in the order of 0.5 to 1.5 absorbance units. As previously mentioned, absorbance of an enzyme sample varies as a logarithmic function of the radiation transmitted through the sample in accordance with the Beer-Lambert equation. As a result, the radiation control means 22 also controls the radiation applied to the test sample in an inverse logarithmic function of the absorbance of the test sample. In order to cover an optical density range of 3:1 (0.5 to 1.5 absorbance units), the radiation control means 22 must be capable of controlling the amount of radiation applied to the test sample for at least a 10 to 1 change.

The radiation control means included in the apparatus of the invention provides two movable control means, the first functioning as a fine control and the second as a coarse control. The combination of the first and second control means function to provide a means to accurately control a wide range of radiation intensities. The second control means conditions the radiation control means 22 into the range of radiation intensities that will be applied during the test (according to the initial sample optical density), while the first control means accurately controls the radiation to keep the system balanced as the chemical reaction proceeds. The movement of the first control means provides a means for determining the rate of change in the radiation absorbance of the test sample. The first and second control means and operation thereof is fully explained with regards to FIGURES 2–5.

Figure 2:
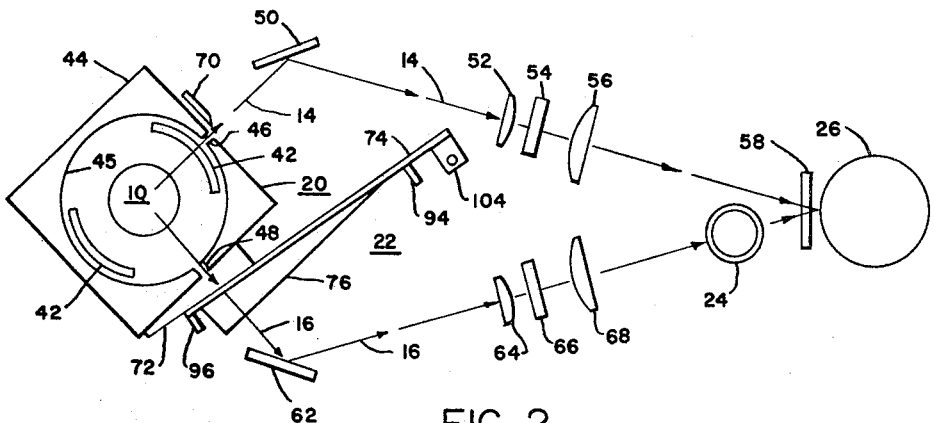
FIGURE 2 is a schematic diagram of an embodiment of the optical portion of the enzyme analyzing apparatus of FIGURE 1.

Referring to FIGURE 2, the light source 10 is surrounded by the beam switch which in the present embodiment is a rotating optical shutter 42, formed with two diametrically opposed slots exhibiting an angle in the order of 90°. The optical shutter 42 is rotated at a constant speed by the motor 18 (FIGURE 1) to permit discrete beams of radiation to pass the optical shutter 42 to the beam splitter 20. The beam splitter 20 includes a block 44 having a cylindrical cavity 45 that is coaxial with the shutter 42 and includes two exit slits 46 and 48 formed in the block spaced 90° apart with respect to the axis of rotation of the shutter 42. The exit slits 46 and 48 allow radiation to emerge from the block 44 to form the reference and sample beams 14 and 16, each chopped at 60 cycle per second rate and 180° out of phase with each other. The reference beam 14 is reflected by a plane mirror 50 to pass through a collimating lens 52, a reference 340 nanometer interference filter 54, a condenser lens 56 and a conventional ultraviolet transmitting glass filter 58 to a photocathode of the photomultiplier tube 26. The sample beam 16 passes through the radiation control means 22 and is reflected by the plane mirror 62 to pass through a collimating lens 64, a sample 340 nanometer interference filter 66, a condenser lens 68, the sample compartment 24, and the filter 58 to the photocathode of the photomultiplier tube 26. The 340 nanometer interference filters may, for example, be Bausch & Lomb Catalog No. 44–78–34 filters. The filters allow a narrow band of wavelengths peaking at 340 nanometers to pass to the sample chamber 24 and the photomultiplier tube 26. The sample compartment 24 is positioned in a water bath (not shown) to hold the test sample at a constant temperature. Mounted adjacent the reference beam exit 46 is the manual set apparatus 27, such as a movable jaw 70, that is adjusted during initial alignment to a radiation level that permits the testing of the most absorbent sample expected to be tested.

Figures 4, 5:
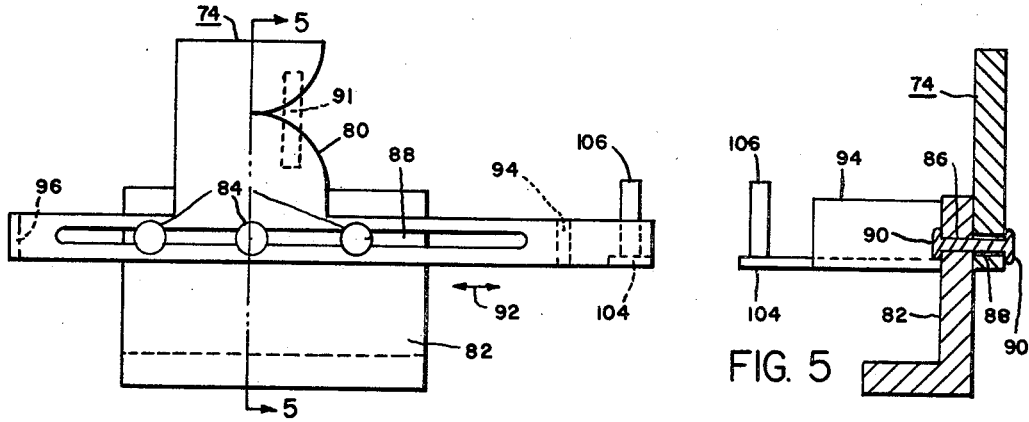
FIGURE 4 is a plan view of the occluder of FIGURE 3.
FIGURE 5 is a cross-sectional view of the occluder of FIGURE 4 taken along the lines 5—5.

The radiation control means 22 embodied in FIGURES 2–4 includes a fixed wedge 72, a first control means illustrated as a balancing wedge 76, and a second control means illustrated as an optical occluder 74. Both the fixed and balancing wedges 72 and 76 are made of semi-transparent material such as N–1 glass that is absorbent at a wavelength of 340 nanometers. The fixed wedge 72 is stationary mounted adjacent the exit slit 48 to compensate for the prismatic effect of the balancing wedge 76. The balancing wedge 76 and the occluder 74 are movably mounted to travel along a path that intersects the sample beam 16 as illustrated in FIGURES 2–4. The occluder 74 functions as a coarse control means or attenuator while the wedge 76 functions as the fine control means or attenuator. They control the intensity of radiation received by a test sample as an inverse function of the transparency of the test sample so that the intensity of the sample beam 16 traversing the sample compartment is controlled to equal that of the reference beam 14.

An embodiment of the occluder 74 is illustrated in FIGURES 3–5. The occluder 74 in the particular embodiment is formed of opaque material and has an opening 80 shaped in the form of a logarithmic function. The occluder 74 may, for example, be movably mounted to a base plate 82 by the bearing means 84. The bearing means 84 include elongated portions 86 (FIGURE 5) that pass through a slot 88 in the occluder 74 and are bearing mounted in the base plate 82. The bearing means 84 also include two enlarged end portions 90 that hold the occluder 74 in place and limit the movement of the occluder 74 along a path in the plane of the slot 88 as designated by the arrows 92 (FIGURE 4).

The occluder 74 is mounted with respect to the sample beam 16 (shown as a dashed cross-section 91 in FIGURE 4) so that the opening 80 intersects the sample beam as the occluder is moved. The logarithmic shape of the opening 80 provides a substantially constant or linear rate of control as the occluder is moved so that ratio of the change in radiation intensity per change of position remains substantially constant. It is to be understood that any particular shaped opening can be employed depending upon the desired type of control.

The balancing wedge 76 is mounted on a bracket 98 that is driven by a screw 92 (FIGURE 3) along a path that intersects the sample beam 16 so that the sample beam is exposed to varying thicknesses of the wedge. The bracket 98 is adapted to engage the extended portions 94 and 96 of the occluder 74 to drive the occluder when the balancing wedge 76 has exceeded a predetermined range of movement. It should be noted that balancing wedge 76 is free to move, to the exclusion of the occluder 74, for a range of movements determined by the distance between the extended portions 94 and 96 and the size of bracket 98. The servomotor 30 is coupled to drive the screw 92 through a belt 100 and a counter wheel 102 to drive the balancing wedge 76 in a direction to balance the intensity of the sample beam to that of the reference beam.

The potentiometer 31 is connected to a source of energizing potential 89 (illustrated as a battery). The movable arm 95 of the potentiometer 31 is coupled to the screw 92 (illustrated schematically by the dashed line 93) to move in synchronous relation with the balancing wedge 76. A signal voltage is developed across the terminals 97 corresponding to the position of the wedge 76. The terminals 97 are adapted to be connected to a recording device to provide a plot of the movement of the balancing wedge 76.

The occluder 74 also includes a third extended portion 104 having a pin 106 extending from an end thereof that is adapted to engage a forked end 105 of a solenoid lever 108. The opposite end 103 of the solenoid lever 108 is pivotally coupled to the movable slugs 110 and 112 of a pair of solenoids 114 and 116 respectively. The lever arm 108 is pivotally mounted for rotation about a pivot point 118.

The solenoids 114 and 116 are connected to be energized through a momentary contact start switch 120 and a two position selector switch 122. The selector switch 122 selects the direction the occluder is initially moved in accordance with the type of chemical reaction that would take place. For example, if the chemical reaction is such that the radiation absorbance of the test sample will increase as the chemical reaction progresses, the switch 122 is positioned (as shown) to energize the solenoid 114. On the other hand if the radiation absorbance of the test sample is decreased as the chemical reaction progresses the switch 112 is positioned to select the solenoid 116. The solenoids 114 and 116 function to move the occluder 74 to introduce a large initial unbalance into the system at the start of a test run in a direction depending upon the type of chemical reaction being monitored.

For purposes of illustration, it is assumed that a test enzyme sample and the required chemical reagents for producing a chemical reaction that results in increasing the radiation absorbance is inserted in the sample compartment 24. The switch 122 is preset to provide for the energization of the relay 114. When the start push-button 120 is momentarily depressed, the solenoid 114 is energized thereby simultaneously moving the occluder 74 toward the counter wheel 102 and introducing a large unbalance in the system. Power is also applied to the terminal 121, which is adapted to be connected to the sequencing circuit 38, to start the timing sequence running. The servomotor 30 rapidly responds to the resultant 60 cycle signal generated by the photomultiplier tube to drive the balancing wedge 76 in the direction to balance the system (away from the counter wheel 102). As the balancing wedge progresses, the bracket 98 engages the occluder extended portion 94 so that the servomotor drives both the balancing wedge 76 and the occluder 74. The opening 80 in occluder 74 is shaped so that the occluder exerts a substantially greater effect on intensity of the radiation received by the test sample than the wedge 76.

The combined effect of the wedge 76 and the occluder 74 increases the gain of the servosystem over that of the wedge alone, providing an under-damped servosystem. As a result, the response of the system is such that the wedge 74 and occluder 76 overshoot the initial balance position. This reverses the polarity of the signal generated by the photomultiplier tube 26. The servomotor 30 responds to the reversed signal polarity to drive the balancing wedge 76 in the opposite direction (toward the counter wheel 102) to an initial balance condition. Since the wedge 76 is moved in the opposite direction, the occluder 74 is disengaged and left at about the point of maximum overshoot. The initial balance point of the wedge 76 is primarily determined by the position at which the occluder 74 is preset thereby providing a coarse radiation control means for conditioning the apparatus for testing the particular sample in the sample compartment. The wedge 76 is now free to move in the range between the extended portions 94 and 96 to the exclusion of the occluder 74 providing a fine radiation control means. While the motor 30 only drives the wedge 76, the gain of the servosystem is reduced, thereby exhibiting a higher damping factor and providing a means for effectively and continuously balancing the system (within the range of movement to the exclusion of the occluder) without any noticeable overshoot.

As previously mentioned, the chemical reaction in the particular illustration is the type wherein the absorbance of the test sample increases as the chemical reaction progresses. Furthermore, the system is balanced by equalizing the intensity of the sample beam to the reference beam. As a result, the wedge 76 is now driven (after the overshoot) in the direction to decrease the wedge thickness exposed to the sample beam 16 (toward the counter wheel 102) to balance the system. It should be noted, as the wedge 76 is back-tracked from the maximum overshoot position, that all the dead-band and back-lash in the system is taken up. Thus, when the wedge 76 reaches the point of the initial null, the subsequent movement of the wedge (in the same direction) provides a means of measuring the change in absorbance (enzyme activity) with a minimum of error due to the above non-linearities.

In the case wherein the chemical reaction monitored causes the absorbance of the test sample to decrease, the switch 122 is set to energize the solenoid 116. The system functions in the same manner as previously described except for reversing the directions of travel of the balancing wedge 76 and the occluder 74.

Figure 6:
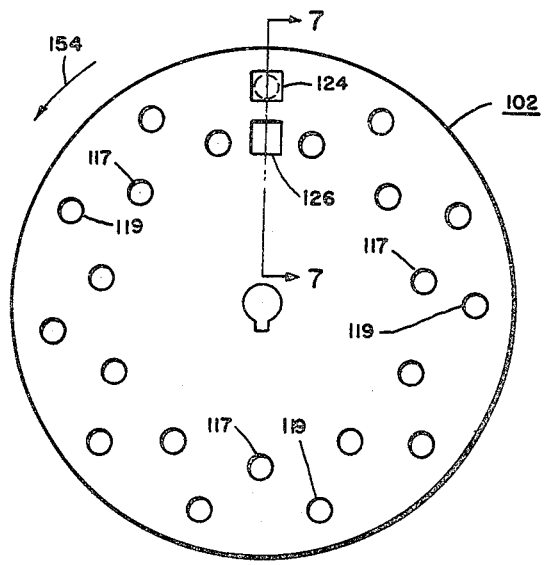
FIGURE 6 is a plan diagram of the counter disk of FIGURE 3.
Figure 7:
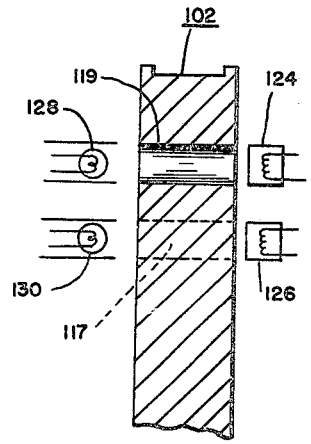
FIGURE 7 is a sectional view of the counter disk of FIGURE 6 taken along the lines 7—7.

The counter wheel 102 provides a means for generating a signal that is a function of the balancing operation of the wedge 76 and, therefore, corresponds to the activity of the enzyme tested. The counter wheel 102 includes two groups of 11 holes 117 and 119 (FIGURE 6) on separate concentric circles about the center of the wheel 102. A pair of radiation sensitive devices 124 and 126, are mounted adjacent the wheel 102 (FIGURES 6 and 7) so that the holes 119 in the outer concentric circle are adapted to pass radiation to the radiation sensitive device 124 and the holes 117 in the inner concentric circle are adapted to pass radiation to the radiation sensitive device 126. The source of radiation for the photosensitive devices includes the lamps 128 and 130 mounted on the opposite side of the wheel 102 and aligned with the concentric circles including the holes 119 and 117 respectively (FIGURE 4), to provide the radiant energy required to actuate the radiation sensitive devices. With wedge 76 having a length of 78 millimeters and an angle in the order of 11 degrees, the transmission of the radiation passing through the wedge changes in the order of 66.7% per change in millimeter of thickness. By using a screw 92 having 16 threads per inch, and a total of 22 holes in the counter wheel 102, approximately one hole passes a radiation sensitive element per a change of one milli-absorbance unit.

The servomotor 30 is coupled through a belt 100 to drive the wheel 102 and the balancing wedge 76 and the occluder 74 in the initial overshoot. When the motor 30 reverses, it drives the wheel 102 (due to changed signal polarity as a result of the overshoot) in synchronous relation with the movement of the wedge 76 so that the number of holes passing the photosensors 124 and 126 correspond to the linear movement of the balancing wedge 76 thereby providing a pulse per milli-absorbance unit change in the absorption or transmission characteristics of the test sample.

Figure 8:
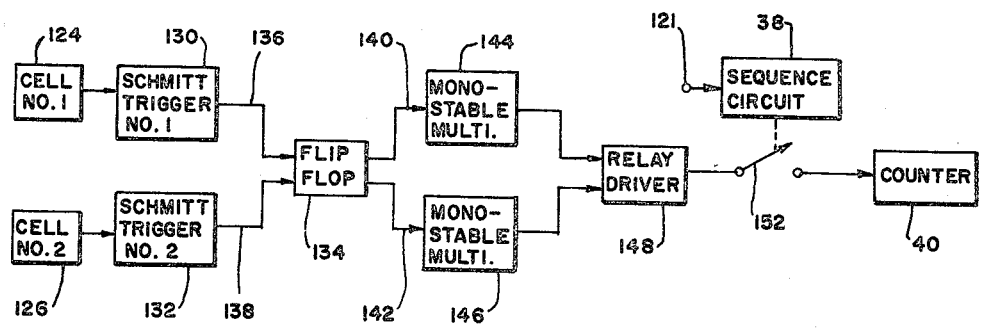
FIGURE 8 is a block diagram of the logic circuit of FIGURE 1.

Referring now to FIGURE 8, the radiation sensitive devices 124 and 126 are coupled to conventional Schmitt trigger circuits 130 and 132 respectively. In response to an electrical pulse generated by the connected radiation sensitive device due to a movement of the wheel 102, the Schmitt triggers 130 and 132 provide a constant amplitude pulse to switch a conventional two input bi-stable flip-flop circuit 134 from one stable state to another. The Schmitt trigger 130 is coupled to the first input 136 to switch the flip-flop into a first stable state while the Schmitt trigger 132 is coupled to the second input 138 to switch the flip-flop 134 into a second stable state. The flip-flop 134 includes two output circuits 140 and 142 coupled to conventional monostable multivibrators 144 and 146 respectively. When the flip-flop 134 is set in the first stable state an output signal developed at the output circuit 140 is applied to the monostable multivibrator 144 so that the monostable flip-flop generates a signal of a preset amplitude and time duration. When the flip-flop 134 is set in its second stable state, a signal generated in the output circuit 142 causes the monostable multivibrator 146 to generate an output signal of a predetermined amplitude and time duration. The signals from the monostable multivibrators 144 and 146 are coupled to a convention relay driver circuit 148 to actuate a relay each time the flip-flop 134 is switched from one stable state to another.

The sequencing circuit 38 is coupled between the relay driver 148 and the counter circuit 40. The sequencing circuit 38 can, for example, be a standard type relay-motor driven cam operated switching circuit that is turned on to run for a pretedmined time duration by momentarily depressing switch 120. The motor driven cam will close a switch 152 coupled between the relay driver 148 and counter circuit 40 after a predetermined time duration sufficient for the balancing wedge 76 and occluder 74 to be driven to the initial balance. The switch 152 will remain closed for the time duration required to monitor the rate of enzyme activity. This type of relay-motor driven cam operated switching circuit is well known in the art and requires no further explanation.

As the servomotor 30 rotates the wheel 102, the radiation sensitive devices 124 and 126 are alternately energized by radiation through the holes in the wheel 102. The holes 117 and 119 are arranged in a preset pattern so that only one radiation sensitive device is energized at any particular time, When the wheel 102 is rotated in a counter-clockwise direction, as illustrated by the arrow 154, the radiation sensitive device 126 is first actuated, generating a signal that sets the flip-flop 134 in a first stable state, causing the relay driver to generate one output pulse. As the wheel 102 is rotated further, the radiation sensitive device 126 is inactivated while the radiation sensitive device 124 is activated, generating a signal which switches the flip-flop 134 to the second stable state, causing the relay driven 148 to generate second pulse. Once the flip-flop 134 is switched into its first stable, no further signals generated by radiation sensitive device 126 are accepted by the logic circuit until the flip-flop 134 is switched to its second stable state by a signal generated by the radiation sensitive device 124. Any signals generated by a radiation sensitive device due to jitter of the wheel 102, will effectively not be accepted by the logic circuit after the first pulse thereby rendering the counter 40 substantially insensitive to undesirable motor shaft jitter.

The counter circuit 40 may, for example, be a commercially available Presin printing counter Model A2–6. The Presin printing counter is adaptable to respond to the actuation of the relay driver and prints the total number of counts over the predetermined counting period. The total number of counts corresponds to the enzyme activity of the test sample. A comparison between the normal enzyme concentration and the concentration in the test sample is made by simply comparing the number of counts printed for each.

The above described system is originally factory pre-calibrated and effectively does not require any further re-calibration due to use, changes in instrument temperature, time, etc. (as normally required in most measuring systems), since the absorbance characteristic of the balancing wedge 76 is a function of its physical structure and essentially does not change with use, time or temperature.

Although primary emphasis has been placed on controlling the intensity of the sample beam 16, it is to be understood that the radiation control means 22 can be mounted to control the intensity of the reference beam 14 rather than the sample beam. In this manner, the intensity of the reference beam 14 will be changed in accordance with the radiation absorbance of the test sample to balance the intensities of the test and reference beam. It should be noted that this type of control suffers a loss in stability since the intensity of the radiation applied to the photomultiplier tube during the period of measurement changes from sample to sample according to their optical density.

In addition, it is to be further understood that the occluder 74 can be monuted to control the intensity of the reference beam 14 while the wedge 76 can control the sample beam 16 or vice versa. If the occluder 74 and the wedge 76 are mounted to control separate beams of radiation, the coupling means between the occluder and the wedge need be modified to provide the required cooperation to balance the intensity of the reference and sample beams received by the photomultiplier tube 26 in a manner as previously described.

FIGURE 10 is a block diagram of a second embodiment of an enzyme analyzer including the invention. The analyzer of FIGURE 10 is a single beam system wherein the intensity of radiation transmitted through a test sample is compared with an electrical reference signal rather than the reference beam of radiation as previously described. Similar components embodied in the block diagrams of FIGURES 1 and 10 are designated by the same reference numerals.

In the analyzer of FIGURE 9, a single continuous beam of radiation is directed from a source of radiation 10 to the photomultipler tube 26 through the radiation control means 22 and the sample compartment 24. The source of radiation may be any suitable source and the method for directing the beam of radiation can be done in any conventional manner. For purposes of illustration, it will be assumed that source 10 of FIGURE 2 is employed, but that the exit slit 46 and the optical shutter 42 are deleted. The embodiments of the radiation control means 22, the sample compartment 24, and the optical beam directing system (lenses 64 and 68 and filters 56 and 58) in FIGURES 2 and 3 apply to the analyzer of FIGURE 9.

The photomultiplier tube 26 generates a direct current (DC) sample signal in response to the applied beam of radiation, the magnitude of which is a function of the intensity of the radiation. The sample signal is amplified by a direct current amplifier 160 and applied to a summing circuit 162. A source of reference signals 164 is also coupled to the summing circuit 162. By way of example, the source of reference signals 164 (FIGURE 9) is illustrated as a battery 166 and a potentiometer 168 connected in shunt therewith. The potentiometer 168 is preset during the initial alignment of the apparatus to a level that permits the testing of the most absorbent sample expected to be tested.

The direct current reference signal generated by the potentiometer 168 is coupled through a summing resistor 170 to a summing junction 172 connected to ground through a resistor 171. The amplified DC sample signal generated by the photomultiplier tube 26 is coupled through a summing resistor 174 to the summing junction 172. The polarity of the reference signal is selected to be opposite that of the amplified sample signal so that a direct current difference signal is developed at the junction 172. The amplitude and polarity of the difference signal is a function of the relative amplitudes of the reference and sample signals. The junction 172 is adapted to be coupled to the amplifier 28 which, in this particular embodiment of FIGURE 9, is a direct current amplifier. An amplified difference signal is applied to the motor 30 which is a direct current servomotor.

The analyzer of FIGURE 9 functions in the same manner as the analyzer of FIGURE 1, except that the system is balanced when the intensity of radiation received by the photomultiplier tube is of a magnitude (determined by the setting of the potentiometer 168) to null the difference signal. By monitoring the movement of the balancing wedge 76 after the initial positioning of the occluder 74 (as previously described), a measurement of the change of test sample absorbance can be made through the use of the counter wheel 102, the detector circuit 32, logic circuit 34, sequence circuit 38 and the counter circuit 40, as previously described.

It should be noted that the effect of system drift, such as that normally experienced in direct current systems due to temperature, component, and power supply changes, will have little effect on the accuracy of the system of FIGURE 9, since the system is automatically rebalanced each time a new sample is received. The only system drift that contributes to possible error is that experienced during the period the movement of the wedge 76 is monitored (which is negligible). Any long term drift is effectively compensated for each time the system is initially rebalanced.

Although the embodiment of FIGURE 9 illustrates a system with a single continuous beam of radiation and a direct current reference signal, it is to be understood that the fundamental concepts described are more generally applicable. For example, the single beam of radiation can be chopped at a 60 cycle rate, as previously described with regards to FIGURE 2, and compared with an alternating current reference signal. An alternating current reference signal having the correct phase relation with the 60 cycle pulses generated by the photomultiplier tube 16, can be conventionally generated by a switching circuit or device synchronized with the operation of beam switch 12.

An example of such a device 176 is illustrated in FIGURE 11. The switching device 176 includes magnetic shield 178 having two openings 180 and 182 formed therein. The magnetic shield is coupled to the shaft 184 of the beam switch motor 18 to rotate in synchronism with the optical shutter 42 of FIGURE 2. A magnet 186 is mounted adjacent one side of the magnetic shield 178 while a magnetic sensitive reed switch 188 is mounted on the opposite side of the shield. As the magnetic shield 178 is rotated, the reed switch 188 is actuated or closed each time the openings 180 and 182 pass between the magnet 186 and the reed switch 188. The magnetic shield is positioned on the shaft 184 so that the reed switch 188 is actuated at a 60 cycle rate 180° out of phase with the chopped beam of radiation applied to the photomultiplier tube 26.

The summing circuit of FIGURE 11 can be simply modified to provide for the alternating system as shown in FIGURE 12. The switch 188 is placed in series between the movable arm of the potentiometer 168 and the summing resistor 170. An operational amplifier 190, including a feedback resistor 192, is connected in series with a capacitor 196 between the summing point 172 and an output terminal 194. The operational amplifier 190 functions to accept alternate 60 cycle pulses from the switch 188 and the amplifier 160 to compare the amplitude thereof and provide a 60 cycle alternating curernt control signal at the output termial 194. The amplitude and phase of the control signal is a function of the relative amplitude of the reference pulses generated at the switch 188 and the amplified photomultiplier tube 26 pulses. In this case, the amplifier 28 and the motor 30 are alternating current type components. In response to the 60 cycle control signal generated at the output terminal 194, the motor 30 will drive the radiation control means 22 in a direction to null the 60 cycle control signal. The system functions in the same manner as previously described with regards to FIGURES 1 and 9.

In both the systems of FIGURES 1 and 9, measurements are made as a function of the movement of the balancing wedge 76 in a manner so that errors to due back-lash and dead-band are effectively eliminated as previously described. Any further back-lash introduced into the system due to continuous use and wear will be eliminated in the same manner.

In addition, it should be noted that the occluder 74 and the balancing wedge 76 function to vary the radiation applied to a test sample inversely with the change in radiation absorbance of the test sample to keep the intensity of the sample beam 16 substantially equal to that of the reference beam 14 (FIGURE 1) or to the amplitude of the electrical reference signal determined by the settling of the potentiometer 168 (FIGURES 10 and 12). In effect, the intensity of sample beam received by the photomultiplier tube during the period of measurements is substantially the same for various densities of test samples. As a result, the sensitivity of the photomultiplier tube does not change from sample to sample, and the gain of the system remains constant thereby minimizing any discrepancies between the testing conditions from sample to sample.

The measuring system of the invention provides a method for kinetically monitoring the reaction rate of a chemical reaction with a minimum of controls thereby minimizing the possibility of operator error. The chemical reagents and the species to be analyzed need only be inserted in the sample compartment 24 in the proper volumes, the switch 122 preset in the proper position and the start button 120 momentarily depressed, whereupon the measuring system automatically provides a reading corresponding to the rate of activity of the test sample. It should be noted that the measuring system is particularly adapted for automated operation wherein a series of test samples with the same type of radiation characteristics (increasing or decreasing radiation absorbance with time) can be exposed in the sample compartment in consecutive order. The momentary closure of switch 120 will produce a reading corresponding to the activity of each of the test samples. Furthermore, although the testing of discrete samples has been emphasized, the measuring system is also adaptable to monitor a continuous fluid flow through the sample compartment to provide a means for monitoring the change in the radiation responsive characteristic of a continuous fluid flow.

We claim:

1. Apparatus for determining the rate of change of radiation absorption of a fluid comprising:
   means for providing alternate reference and sample beams of radiation;
   means for directing said reference and sample beams on a radiation sensitive device to generate an electrical signal, the amplitude of which is a function of the difference in intensity of said reference and sample beams;
   means positioned in said sample beam for receiving said fluid and for applying said sample beam thereto;
   means movably mounting a first radiation attenuator for movement along a path that intersects said sample beam to control the intensity thereof;
   means movably mounting a second radiation attenuator for movement along a path that intersects said sample beam to control the intensity thereof;
   coupling means coupling said first radiation attenuator to said second radiation attenuator to provide for a predetermined range of movement of said first radiation attenuator to the exclusion of said second radiation attenuator and for joint movement of said first and second radiation attenuators when said predetermined range is exceeded, the position of said predetermined range of movement along said path of said first radiation attenuator movement being determined by the position of said second attenuator;
   servo means including a motor coupled between said radiation sensitive device and said first radiation attenuator to drive said first radiation attenuator in a direction to balance the intensities of said sample and reference beams received by radiation sensitive device whereby said first and second radiation attenuators cooperate to initially balance said beams and said first radiation attenuator is driven in said predetermined range of movement to balance said beams due to changes in radiation absorption of said fluid; and
   means coupled to said first control means for monitoring the movement of said first control means to provide an indication of the change of radiation absorbance of said fluid.

2. The apparatus as defined in claim 1 wherein said second radiation attenuator exhibits a greater effect upon the intensity of radiation received by said radiation sensitive device in response to a movement of said first attenuator beyond said predetermined range of movement than said first attenuator thereby providing a coarse radiation control when both said first and second attenuators are moved and a fine radiation control when said first radiation attenuator moves in said predetermined range.

3. The apparatus as defined in claim 1 wherein: said first radiation attenuator comprises a device of varying thickness movably mounted to intersect said beam of radiation so that said beam passes through a portion of said device, the amount of said radiation absorbed by said device being a function of the thickness of said device receiving said radiation; and said second radiation attenuator comprises an opaque device formed with an opening therein, said opaque device being movably mounted along a path so that said opening intersects said beam of radiation whereby the amount of radiation reaching said element is determined by the portion of said opening being located in the path of said beam of radiation.

4. Apparatus as defined in claim 1 wherein
   said first radiation attenuator comprises an optical wedge mounted to move along a straight line to intersect said beam of radiation so that the thickness of the portion of said wedge intersecting said beam of radiation determines the amount of radiation absorbed by said wedge, the amount of radiation absorbed by said wedge being a substantially linear function of the movement of said wedge, and
   said second radiation attenuator comprises an opaque device formed with a logarithmetically shaped opening therein, said opaque device being movably mounted along a path so that said opening intersects said beam of radiation whereby the amount of radiation reaching said element is determined by the portion of said opening being located in the path of said beam of radiation.

5. The apparatus as defined in claim 1 including
   means coupled to said first radiation attenuator for positioning said first radiation attenuator to introduce an unbalance in the intensity of said sample and reference beams received by said radiation sensitive device so that said motor drives said first radiation attenuator to engage said second radiation attenuator to cooperate to initially balance the intensity of the beams and subsequently maintains the beams balanced as the amount of radiation absorption by said fluid changes by driving said first radiation attenuator in said predetermined range of movement; and
   wherein said second radiation attenuator exhibits a greater effect upon the intensity of radiation received by said radiation sensitive device in response to a movement of said first attenuator beyond said predetermined range of movement than said first attenuator so that the gain of said servo means is greater when driving both said first and second radiation attenuators than when driving the first radiation attenuator alone, so that said first and second radiation attenuators are driven to overshoot the initial balance condition and said second radiation attenuator is positioned approximately at the point of maximum overshoot.

6. The apparatus as defined in claim 1 including
   means coupled to said second radiation attenuator for initially positioning said second radiation attenuator to introduce an unbalance in the intensity of said sample and reference beams received by said radiation sensitive device so that said servo means drives said first radiation attenuator to engage said second radiation attenuator to cooperate to initially balance the intensity of the beams and subsequently maintains the beams balanced by driving said first radiation attenuator in said predetermined range of movement.

7. The apparatus as defined in claim 6
   wherein said means coupled to said second radiation attenuator for initial positioning thereof, drives said second radiation attenuator in the direction said servo means subsequently drives said first radiation attenuator to maintain said beams balanced, and
   wherein the gain of said servo means when driving both said first and second radiation attenuators is greater than when driving said first radiation attenuator or alone so that in response to said initial positioning of said second radiation attenuator said servo means initially drives said first and second atenuators to beyond the point at which the intensities of said beams are balanced and then drives said first radiation attenuator back to balance the intensities of said beams.

8. The combination comprising:
a radiation sensitive device for generating an electrical signal in response to radiation applied thereto;
first means for directing first and second beams of radiation on said radiation sensitive device;
second means adapted to position a test sample to be analyzed in said first beam of radiation;
first radiation control means movably mounted to intersect one of said first and second beams of radiation to control the intensity thereof;
second radiation control means movably mounted to intersect one of said first and second beams of radiation to control the intensity thereof;
third means coupled between said first and second radiation control means and said radiation sensitive element responsive to the electrical signal generated by said radiation sensitive device for driving both said first and second control means in a direction for initially balancing the intensities of said first and second radiation beams received by said radiation sensitive device and for subsequently driving one of said first and second radiation control means for maintaining the intensities of said first and second radiation beams received by said radiation sensitive device balanced;
fourth means coupled to said one of said first and second radiation control means subsequently driven by said third means for generating signals corresponding to the movement of said one of said first and second control means; and
fifth means coupled to said fourth means for monitoring said signals generated by said fourth means while third means subsequently drives said one of said first and second radiation control means to provide a measure of the change of response of said test sample to said applied one of said first and second beams of radiation.

9. The combination as defined in claim 8 including:
means coupled to one of said first and second radiation control means for moving said one of said first and second radiation control means in a direction to unbalance the intensities of said first and second beams of radiation received by said radiation sensitive device.

10. Apparatus for measuring the concentration of a constituent in a sample, said sample being adapted to be entered in a reaction in which the response of said reaction to applied radiation changes as a function of the concentration of said constituent as said reaction progresses comprising:
means adapted for transmitting radiation through the reactants of said reaction including said sample;
means including a radiation sensitive device for detecting the radiation thusly transmitted and comparing it with a reference signal for developing a control signal;
servomechanism loop means, including first and second radiation control means, responsive to said control signal to initially drive said first and second control means to preset the apparatus in condition to make measurements of the response of said reaction to said applied radiation and to control said first control means in accordance with the change in response of said reaction to applied radiation; and
means coupled to said servomechanism loop means to monitor its control of said first control means to provide measurement of the concentration of the constituent in accordance with the chnge of response of said reaction to the applied radiation.

11. Apparatus for determining the change of radiation absorption of a fluid comprising:
first means adapted for applying a beam of radiation on said fluid;
second means receiving radiation transmitted through said fluid for generating an electrical sample signal, the amplitude of which is a function of the intensity of the beam of radiation transmitted through said fluid, and for generating an electrical reference signal that is compared with the sample signal to develop an electrical control signal;
third means for movably mounting a first radiation attenuator along a path that intersects said beam of radiation to control the intensity of radiation received by said second means;
fourth means for movably mounting a second radiation attenuator along a path that intersects said beam of radiation to control the intensity of radiation received by said second means;
fifth means, including a motor, coupled between said second means and said first and second radiation attenuators to drive said first and second radiation attenuators in a direction to initially null said electrical control signal and for subsequently driving said first radiation attenuator to maintain said electrical control signal nulled as the radiation absorbance characteristic of said fluid changes; and
sixth means coupled to monitor the movement of said first radiation attenuator as it is subsequently driven to provide an indication of the change of radiation absorbance of said fluid.

12. Apparatus as defined in claim 11 wherein said second means comprises:
radiation sensitive means for receiving said radiation transmitted through said fluid and for generating said electrical sample signal;
means for directing a reference beam of radiation on said radiation sensitive means, the intensity of which determines the amplitude of said electrical reference signal; and
circuit means for comparing the intensity of said sample and reference signals and for generating an electrical control signal the amplitude and polarity of which is a function of the difference in amplitude of said sample and reference signals.

13. Apparatus as defined in claim 11 wherein said second means comprises:
radiation sensitive means for receiving said radiation transmitted through said fluid and for generating said electrical sample signal;
a source of reference potential;
means coupled to said source of reference potential for generating an electrical reference signal having a predetermined amplitude; and
summing circuit means for comparing the amplitude of said sample and reference signals and for generating an electrical control signal the amplitude and polarity of which is a function of the difference in amplitude of said sample and reference signals.

14. Apparatus for measuring the concentration of a particular constituent in a mixture, said mixture being adapted to be entered into a chemical reaction that exhibits a change in radiation absorbance as said chemical rection progresses, the rate of change of radiation absorbance being a function of the concentration of said constituent comprising:
a radiation sensitive device for developing an electrical signal in response to radiation applied thereto;
means for alternately applying reference and sample beams of radiation to said radiation sensitive device;
means positioned in said sample beam adapted for receiving the reactants of said chemical reaction including said mixture so that said radiation sensitive device develops an alternating electrical signal, the amplitude of which is a function of the difference in the intensity of said applied sample and reference beam;
first and second radiation attenuators movably mounted to intersect said sample beam to control the intensity of the sample beam received by said radiation sensitive device;
servomechanism loop means coupled between said first attenuator and said radiation sensitive device, said servomechanism loop means being responsive to said electrical signal to drive said first control means in a direction to balance the intensities of said sample and reference beams;

means coupling said first attenuator to said second attenuator so that said first attenuator is free to travel over a predetermined range of movement to exclusion of the second attenuator and engages said second attenuator after exceeding said predetermined range to vary the position of said predetermined range of movement;

means for initially unbalancing the intensities of said sample and reference beams when said reactants of said chemical reaction are received for analysis so that said servomechanism loop means drives said first attenuator to engage said second attenuator whereupon said first and second attenuators cooperate to balance the reference and sample beams and for subsequently driving said first attenuator in said predetermined range of travel to maintain said sample and reference beam intensities received by said radiation sensitive device balanced as said chemical reaction progresses; and means coupled to said servomechanism loop means to monitor the movement of said first attenuator in said predetermined range to provide an indication corresponding to the concentration of said known constituent.

15. Apparatus for measuring the concentration of a particular constituent in a mixture, said mixture being adapted to be entered into a chemical reaction that exhibits a change in radiation absorbance as said chemical reaction progresses, the rate of change of radiation absorbance being a function of the conentration of said constituent comprising:

a radiation sensitive device for developing an electrical signal in response to radiation applied thereto;

means for applying a beam of radiation to said radiation sensitive device;

means positioned in said beam adapted for receiving the reactants of said chemical reaction including said mixture so that said radiation sensitive device develops an electrical signal the amplitude of which is a funtion of the intensity of said beam of radiation transmitted through said reactants;

means for generating a reference potential;

circuit means receiving said reference potential and said electrical signal developed by said radiation sensitive device for developing a difference signal, the magnitude of which is a function of the magnitude of said reference potential and said electrical signal;

first and second radiation attenuators movably mounted to intersect said beam of radiation to control the intensity of the beam of radiation received by said radiation sensitive device;

servomechanism loop means coupled between said first attenuator and said circuit means, said servomechanism loop means being responsive to said difference signal to drive said first control means in a direction to null said difference signal;

means coupling said first attenuator to said second attenuator so that said first attenuator is free to travel over a predetermined range of movement to exclusion of the second attenuator and engages said second attenuator after exceeding said predetermined range to vary the position of said predetermined range of movement;

means for initially positioning said second attenuator when said reactants of said chemical reaction are received for analysis so that said servomechanism loop means drives said first attenuator to engage said second attenuator whereupon said first and second attenuators cooperate to null said difference signal and subsequently drives said first attenuator in said predetermined range of travel to maintain said difference signal effectively nulled as said chemical reaction progresses; and means coupled to said servomechanism loop means to monitor the movement of said first attenuator in said predetermined range to provide an indication corresponding to the concentration of said known constituent.

16. Apparatus for measuring a change in response of a reaction to applied radiation comprising:

first means adapted to receive the reactants of said reaction to be observed;

second means for applying a beam of radiation to said reactants;

third means for subsequently receiving said beam of radiation and for detecting the loss in intensity of said beam of radiation to develop an electrical control signal that is a function of the loss in intensity of said beam of radiation;

first and second radiation control means movably mounted for controlling the intensity of the radiation received by said third means;

fourth means responsive to said electrical control signal coupled for initially driving said first and second control means to preset the intensity of said beam of radiation received by said third means and subsequently driving said first control means in accordance with any change in the intensity of the beam received by said third means to maintain said intensity substantially constant;

fifth means coupled to said first control means to provide an indication of the change of the radiation response of said sample; and sixth means coupled to said second radiation control means for moving said second radiation control means in a predetermined direction prior to observing the response of said reactants to applied radiation.

References Cited

UNITED STATES PATENTS

| | | | |
|---|---|---|---|
| 3,071,037 | 1/1963 | Brumley | 250—218 X |
| 3,270,348 | 8/1966 | Lesage et al. | |
| 3,292,484 | 12/1966 | Clay | 356—205 |

JOSEPH SCOVRONEK, Primary Examiner

U.S. Cl. X.R.

23—259; 195—127; 250—43.5, 218; 356—205